United States Patent Office 3,477,963
Patented Nov. 11, 1969

3,477,963
CARBON DISULFIDE SULFIDING OF CATALYSTS
John J. van Venrooy, Media, Pa., assignor to Sun Oil
Company, Philadelphia, Pa., a corporation of New
Jersey
No Drawing. Filed Dec. 20, 1966, Ser. No. 603,145
Int. Cl. B01j 11/74; C10g 23/02, 35/06
U.S. Cl. 252—439                                   17 Claims

ABSTRACT OF THE DISCLOSURE

A metal sulfiding technique for the preparation of metal sulfide catalysts such as Group VIII and Group VI–B metal sulfides exemplified by a nickel-molybdenum sulfide mixture using an organo sulfide such as $CS_2$ as the sulfiding agent. The organo sulfide is first passed over a pre-sulfided metal sulfide catalyst stock before passing over the metal composition to be sulfided at sulfiding conditions of about 350 to 650° F. and a pressure of about atmospheric to 300 p.s.i.g.

---

The present invention relates to the preparation of metal sulfide catalysts. In more particular, it relates to improvements in sulfiding procedures in the preparation of metal sulfide catalysts using organo sulfur compounds, and especially carbon disulfide, as a sulfiding agent. Still more particularly, it relates to improvements in sulfiding catalysts wherein the organo sulfur compound is enhanced as a sulfiding agent by first passing same over fully sulfided catalyst.

BACKGROUND OF THE INVENTION

It is well known that certain catalysts have high efficiency for the treatment of oils by hydrogenation. Hydrotreating of oils may be practiced for several purposes, among them the removal of sulfur and nitrogen containing species, the removal of double bonds both conjugated and non-conjugated in olefins and diolefins, the removal of aromaticity for color improvement and stability, selective hydrocracking to produce oils of improved viscosity, and the complete hydrocracking of heavy oils to produce gasoline range components.

Typical of the catalyst used for this type of hydrotreating process are metals of Group VIII and Group VI–B either alone or in combination and usually dispersed on a support such as alumina or silica-alumina. The catalysts of this invention may be non-halogen promoted or they may be treated with a halogen such as fluorine or chlorine. The catalytic metal is usually provided as the metal oxide or combination of metal oxides, e.g., $NiO-MoO_3$ on an $Al_2O_3$ support. In order to achieve high catalytic activity and catalyst life when processing sulfur and nitrogen containing feed stocks, it has been the usual practice to convert the metallic oxides to their sulfides. This has been done in a number of ways in more recent times and commercially by such methods as using a high sulfur content oil, adding $CS_2$ or other organic sulfides and disulfides to an oil carrier or by using $H_2S$ to sulfide the catalyst. The latter is usually done in the presence of hydrogen, but an inert gas alone or in admixture with the hydrogen has and can be used.

All of these various techniques, while being more or less effective, suffer disadvantages of a severity of significant commercial importance. Hydrogen sulfide techniques suffer from the expense of the hydrogen sulfide, and difficulties in handling same, while techniques using organo sulfur compounds, such as carbon disulfide, suffer from operating efficacy in producing the catalyst and its resultant activity in actual use. One particular problem with carbon disulfide under normal techniques is a very long induction period before sulfiding takes place which is of considerable disadvantage when a commercial plant is off production awaiting catalyst regeneration to say nothing of the additional expense simply from requiring the additional sulfiding time. Still further sulfiding with carbon disulfide generally requires a substantially higher temperature than does sulfiding with $H_2S$ to achieve the same high degree of sulfur utilization.

It is accordingly a primary object of this invention to provide a technique whereby organo sulfur compounds equal, or substantially equal, if they do not exceed the effectiveness of hydrogen sulfide in actual sulfiding of catalysts while maintaining its economic and operating advantages.

It is a further object to provide operating economies in the form of milder conditions of sulfiding and in simpler sulfiding equipment.

It is an important object to make carbon disulfide more competitive with hydrogen sulfide so as to provide a less hazardous sulfiding technique.

It is still another object to make possible superior catalysts wherein greater amounts of sulfur are introduced into the catalyst.

These and other related objects will become apparent from a reading of this discussion as a whole and particularly when viewed in light of the vast known prior art experience in this area of sulfiding.

To the accomplishment of the foregoing and related ends, it has been found that organo sulfur compounds, such as mercaptans, thianes, sulfides, disulfides, and especially carbon disulfide, are greatly enhanced as sulfiding agents in the preparation of Group VIII and Group VI–B metal sulfide catalysts by passing the organo sulfur compounds and hydrogen over a pre-sulfided metal sulfide catalyst at sulfiding conditions and then passing the same over an unsulfided catalyst stock at conventional sulfiding conditions or at slightly milder conditions.

To be more specific as to the organo sulfur compounds, they can be mercaptans of about 1–6 carbon atoms, thiane, dithiane, trithiane, thio ethers or sulfides and dithio ethers or disulfides of about 2 to 12 carbon atoms. Illustrative examples of the mercaptans and sulfides are methyl mercaptan, propyl mercaptan, hexyl mercaptan, butyl mercaptan, dimethyl sulfide, diethyl sulfide, ethylthiobutane, methylthiononane, dihexyl sulfide, bis-(2-methylpentyl) sulfide, propyl-4-methylheptyl sulfide, dimethyl disulfide, dipropyl disulfide, ethyldithiopentane, butyldithioheptane, dihexyl disulfide. For convenience, simplicity, and because it is preferred, the sulfiding organo sulfur compound hereafter will simply be referred to as carbon disulfide, but such is not intended to be limiting.

As has been briefly indicated hereinabove, the catalyst which can be employed as hydrogenation catalysts of the type contemplated comprise metals of Group VIII and Group VI–B of the Periodic Table either alone or in combination and usually deposited on either an inert or enhancing support. Illustrative examples are tungsten, chromium, molybdenum, cobalt, iron, nickel, platinum, etc. or mixtures of such metals. Any of the well-known catalyst supports may be employed, such as activated carbon, alumina, zirconia, thoria, pumice, silica, silica-alumina compositions, crystalline molecular sieves having relatively uniform pore diameters in the 6 to 14 angstrom range e.g., of the X or Y crystal types and comprising silica, alumina and one or more exchangeable cations, such sieves being discussed in more detail in U.S. Patents 3,235,485, etc. The preferred catalysts are combinations of cobalt and molybdenum and nickel and molybdenum. Usually the catalyst stock to be sulfided is in the form of the oxide, preferably in granulated form. Small amounts of other compounds, such as oxides of alkali metal, phosphoric acid residues, can also be present and in some cases are preferred. Specific illustrative and preferred examples of such catalyst stocks are:

Composition #1: 3% NiO, 15% $MoO_3$, 0.02% $Na_2O$, 1.5% (about) P, Remainder $Al_2O_3$.

Composition #2: 3% CoO, 15% $MoO_3$, 0.02% $Na_2O$, 1.5% (about) P, Remainder $Al_2O_3$.

Physical Properties, Composition #1: Apparent Bulk Density, g./cc. 0.60; Surface Area, $m.^2/g.$ 298; Pore Volume, cc./g. 0.55; Granule Size $\frac{1}{16}''$.

Physical Properties, Composition #2: Apparent Bulk Density, g./cc. 0.60; Surface Area, $m.^2/g.$ 230; Pore Volume, cc./g. 0.56; Granule Size $\frac{1}{16}''$.

Further information on the composition and method of preparing the foregoing catalysts can be found in British Patent No. 1,024,317 issued to The American Cyanamid Company on Mar. 30, 1966. The preferred catalysts in the table are available from The American Cyanamid Company under the designation Aero HDS-3 Catalyst.

Conventional sulfiding features, including dissolving the organo sulfur compound in a hydrocarbon solvent, such as an olefin-free naphtha, light lube oil, which is incapable of activating the catalyst alone (i.e., not containing sulfur or sulfur compounds), and white oil may be used.

Other known sulfiding conditions may be employed when passing the carbon disulfide over the metal sulfide catalysts or when passing the effluent from having done so over the catalyst stock to be sulfided. Typically, these conditions include a temperature of about 300° to 750° F. and a pressure of about atmospheric (i.e. about 15 p.s.i) to about 1000 p.s.i.g. Preferably the pressure is in the range of about 15 p.s.i. to 300 p.s.i.g. Most preferably, the temperature is 400° to 500° F. and most preferably, the pressure is about atmospheric.

One cautionary note is in order in regard to temperature in order to obtain catalysts of relatively high activity and long life, and that is to avoid exposing the catalyst to a reducing atmosphere at temperatures above about 500° F. before sulfiding is complete.

It is also possible to operate with different conditions prevailing in the zone of the presulfided catalyst as compared to that in the zone of the "raw" catalyst stock where the actual sulfiding is conducted. Generally, this will require the use of two reactors, although in cases where the pressure employed in each is the same and only the temperature differs, it is possible to use one reactor. This is accomplished by merely partially loading (i.e., about 10 to 20% by volume in the absence of air) a catalyst bed to be sulfided with a presulfided catalyst charge at the end where the carbon disulfide is charged. Another possibility is to sulfide the top 10% to 20% of the catalyst with $H_2S$ and then complete the sulfiding with the organic sulfides. Still another convenient alternative is to maintain a charge of sulfided catalyst in a small separate reactor manifolded to provided for passing the organo sulfide over it first when a catalyst bed is to be sulfided. In such a case the reactor would be valved off and the bed kept blanketed with an inert gas such as methane to exclude oxygen. When the conditions are varied in the sulfiding reactor as compared to the presulfided catalyst zone, the conditions in the sulfiding zone typically are milder and include temperatures of about 330° to 600° F. and pressures of about 15 to 300 p.s.i.g. More preferably about 400° to 500° F. and about atmospheric pressure.

As with hydrogen sulfide, it will be found advantageous on occasion to employ excess hydrogen along with the carbon disulfide. The carbon disulfide passed over the presulfided catalyst is transformed into a mixture of gases comprising $H_2S$, $CH_4$, $CH_3$—SH and $CH_3$—S—$CH_3$. It is this mixture of gases which does the actual sulfiding. The exact composition of this mixture depends on the ratio of hydrogen to carbon disulfide (or other organo sulfur compounds), the temperature and pressure, as well as the activity and amount of sulfided catalyst already present. The composition, however, is not critical.

Generally, a stream of sulfiding gas containing about 8–10 mol. percent $CS_2$ in hydrogen flowing at the rate of 50 cc. of gas per cc. of catalyst per hour (or the equivalent amount of gases resulting from passing same over presulfided catalyst) is found adequate and is employed. Normally, sulfiding is complete under such a flow and conditions in about 4 to 5 hours when sulfiding 100 cc. of catalyst, although it will take longer on occasion. Those skilled in the art are aware that the relative progress of the sulfiding can be detected by color change of the catalyst stock being sulfided. The catalyst first turns gray and then black. In any event, it is possible to readily ascertain when the sulfiding is complete by analysis of the gases leaving the sulfiding zone. When such gases are little changed as to sulfur content over that entering zone, then sulfiding is complete, although some advantage may accrue from continuing sulfiding for a few more hours after such condition is obtained.

To facilitate the understanding of the invention, certain details and illustrative embodiments will now be set forth; however, of course, it is to be fully understood and appreciated that the invention is not limited to the specific conditions or details set forth in these examples, since the process is capable of many modifications and variations and conditions, such modifications and variations being aided, suggested or indicated by the discussion of the process as found herein and discussions of the trends in effect of the various factors.

Example I.—Using $H_2S$ as sulfiding agent

A vertical tubular all-glass reactor equipped with an external heating jacket was loaded with 75 grams of Aero HDS–3A nickel-molybdenum catalyst identified hereinabove. The catalyst pellets were approximately $\frac{1}{16}$ inch in diameter and $\frac{1}{4}$ inch long. The bed of catalyst was approximately 1 inch in diameter and 8.5 inches long. The bed of catalyst was heated to 400° F. at atmospheric pressure while passing a stream of nitrogen through the bed. The flow of nitrogen was stopped and a mixture of $H_2S$ and hydrogen was admitted into the top of the reactor. The hydrogen flow rate amounted to 60 cc. per minute and the $H_2S$ flow rate was 10 cc. per minute. The inlet section of the bed of catalyst turned dark black on contact with the sulfiding gas mixture. As the sulfiding continued the blackened portion of the bed increased as the sulfiding zone moved progressively down the bed with a sharp leading edge between sulfided and unsulfided section. Infra-red and vapor phase chromatographic analyses of the exit gas showed no $H_2S$ present indicating complete utilization of the sulfiding agent. The sulfiding process was continued until the final outlet portion of the bed turned black. Analysis of the effluent gas now showed the presence of large amounts of $H_2S$ in the effluent gas which quickly reached the same level as the feed. These results indicated 100% utilization of the $H_2S$ sulfiding agent up to the breakthrough point. Chemical analysis of the catalyst indicated the presence of 4.7 wt. percent of sulfur.

Example II.—Using $CS_2$ without this inventive feature

The reactor utilized in the previous example was loaded with 40.1 gms. of Aero HDS–3A nickel-molybdenum catalyst. The bed of catalyst was approximately 1 inch in diameter and 5.0 inches long. The bed was heated to 400° F. at atmospheric pressure while passing a stream of nitrogen through it. The flow of nitrogen was stopped and a mixture of $CS_2$ and $H_2$ was admitted into the top of the reactor. The hydrogen flow rate amounted to 75 cc. per minute and the $CS_2$ flow rate amounted to 7.2 cc. per minute of vapor. The mixtures of $CS_2$ and $H_2$ upon contacting the bed of catalyst gradually changed the color of the entire bed from light yellow to a light gray. The exit gas from the reactor was analyzed by infra-red and vapor phase chromatographic techniques which indicated the presence of large amounts of unreacted $CS_2$. As the sulfiding continued the bed became progressively darker and finally became dark black. The sulfiding was continued until the exit gas showed the presence of $H_2S$. The bed of catalyst was analyzed by chemical methods and found to contain 3.7 wt. percent sulfur. Based on the amount of sulfurous $CS_2$ fed to the reactor and the final sulfur content of the catalyst bed only 53% utilization of the available sulfur was achieved in this experiment.

Example III.—Using $CS_2$ according to this invention

A vertical tubular all-glass reactor was equipped with two external heating jackets positioned one above the other so as to provide two independent heating zones. The upper heater was used to heat a bed of HDS-3A nickel-molybdenum catalyst which has already been sulfided with $H_2S$ and $H_2$ at atmospheric pressure to 550° F. This upper inlet bed of catalyst amounted to 30.2 gms. and was approximately 1 inch in diameter and 3.5 inches long. The lower heating jacket was maintained at 400° F. and was used to heat the as yet unsulfided bed of HDS-3A nickel molybdenum catalyst. The lower bed of catalyst amounted to 75 gms. of catalyst and was approximately 1 inch in diameter and 8.5 inches long. During the heat up period a stream of $N_2$ was passed through the two beds of catalyst from top to bottom. The flow of $N_2$ was stopped and a mixture of $CS_2$ and $H_2$ was admitted into the top so that contact was first made with the sulfided portion of the bed of catalyst. The hydrogen flow rate amounted to 75 cc. per minute and the $CS_2$ flow rate amounted to 7.2 cc. per minute of vapor. The $CS_2$ upon contacting the presulfided and activated portion of the catalyst in the presence of $H_2$ was reduced principally to $CH_4$ and $H_2S$. The mixture of $CS_2$ reduction products was carried to the top of the lower unsulfided portion of the bed of catalyst which immediately started to turn dark black. As the sulfiding continued the blackened portion of the bed increased in amount as the sulfiding zone moved progressively down the bed with a sharp leading edge between the sulfided and unsulfided sections. Infra-red and vapor phase chromatographic analyses of the exit gas showed no $H_2S$ present, a trace of $CS_2$ and a large amount of $CH_4$ thereby indicating almost complete utilization of the sulfiding agent. The sulfiding process was continued until the final outlet portion of the bed turned black and $H_2S$ appeared in the effluent gas. The bed of catalyst was analyzed by chemical methods and found to contain 3.81 wt. percent sulfur. Based on the amount of sulfur as $CS_2$ fed to the reactor and the final sulfur content of the catalyst bed as much as 91% utilization of the available sulfur was achieved by the methods of this invention. This is very close to the sulfur utilization of that obtained with $H_2S$ and an increase of 38% in the sulfur utilization when using carbon disulfide without the present invention.

Having now described the invention, many ramifications and modified embodiments will readily occur to those skilled in the art. Insofar as such variations do not depart from the spirit and scope of the invention described in this application, they are intended to be embraced by the appended claims in their broadest construction.

The invention claimed is:

1. In a process of preparing metal sulfide catalysts comprising sulfides of members of Groups VIII and VI-B of the Periodic Table wherein metals of said groups or the corresponding oxides of said metals are sulfided in the presence of hydrogen with an organo sulfide containing only carbon, hydrogen and sulfur atoms selected from the group consisting of mercaptans, monosulfides, disulfides and thianes, the improvement comprising first passing said organo sulfide over a presulfided metal sulfide catalyst comprising a member of said groups of the Periodic Table, under sulfiding conditions including a temperature of at least about 300° F. in both the zone containing the presulfided catalysts and the zone containing the unsulfided catalyst.

2. A process according to claim 1 wherein the presulfided metal sulfide catalyst was obtained by sulfiding the first about 10 to 25% by volume of the catalyst bed by charging hydrogen sulfide as the sulfiding agent.

3. A process according to claim 1 wherein the organo sulfide is carbon disulfide.

4. A process according to claim 1 wherein the sulfiding is carried out at about 300° to 750° F. and about atmospheric to 1000 p.s.i.g.

5. A process according to claim 3 wherein said metal catalyst is prepared by sulfiding at least one metal selected from the group consisting of nickel, cobalt, and molybdenum.

6. A process according to claim 5 wherein the temperature employed is 350° to 650° F. and about 15 p.s.i. to 300 p.s.i.g.

7. A process according to claim 5 wherein the sulfiding temperature is 400° to 500° F. and the pressure is about atmospheric.

8. A process according to claim 1 wherein the presulfided catalyst zone is operated at about 350° to 650° F. and about 15 to 300 p.s.i.g., and the sulfiding zone is operated at about 350° to 600° F. and about 15 p.s.i. to 300 p.s.i.g.

9. A process according to claim 8 wherein the pressure in both zones is about atmospheric.

10. A process according to claim 4 wherein the metal to be sulfided is deposited on a support.

11. A process according to claim 5 wherein the metal to be sulfided is deposited on a support.

12. A process according to claim 5 wherein said metal is first deposited on an alumina support before sulfiding.

13. A process according to claim 12 wherein a mixture of nickel and molybdenum are sulfided.

14. A process according to claim 12 wherein a mixture of cobalt and molybdenum are sulfided.

15. A process according to claim 13 wherein about 3% by weight NiO and about 15% by weight $MoO_3$ are employed and the remainder of the catalyst consists essentially of alumina.

16. A process according to claim 13 wherein about 3% by weight CoO and about 15% by weight $MoO_3$ are employed and the remainder of the catalyst consists essentially of alumina.

17. A process according to claim 5 wherein an excess of hydrogen gas is charged to the sulfiding zone.

References Cited
UNITED STATES PATENTS

| | | | |
|---|---|---|---|
| 2,793,170 | 5/1957 | Stiles et al. | 252—439 XR |
| 3,114,701 | 12/1963 | Jacobson et al. | 252—439 XR |
| 3,329,826 | 7/1967 | Pine et al. | 252—439 XR |

PATRICK P. GARVIN, Primary Examiner

U.S. Cl. X.R.

208—108, 143, 215, 254